May 14, 1963
R. E. SAVARIA
3,089,677
DUMP VALVES FOR AIRCRAFT
Filed Aug. 25, 1959
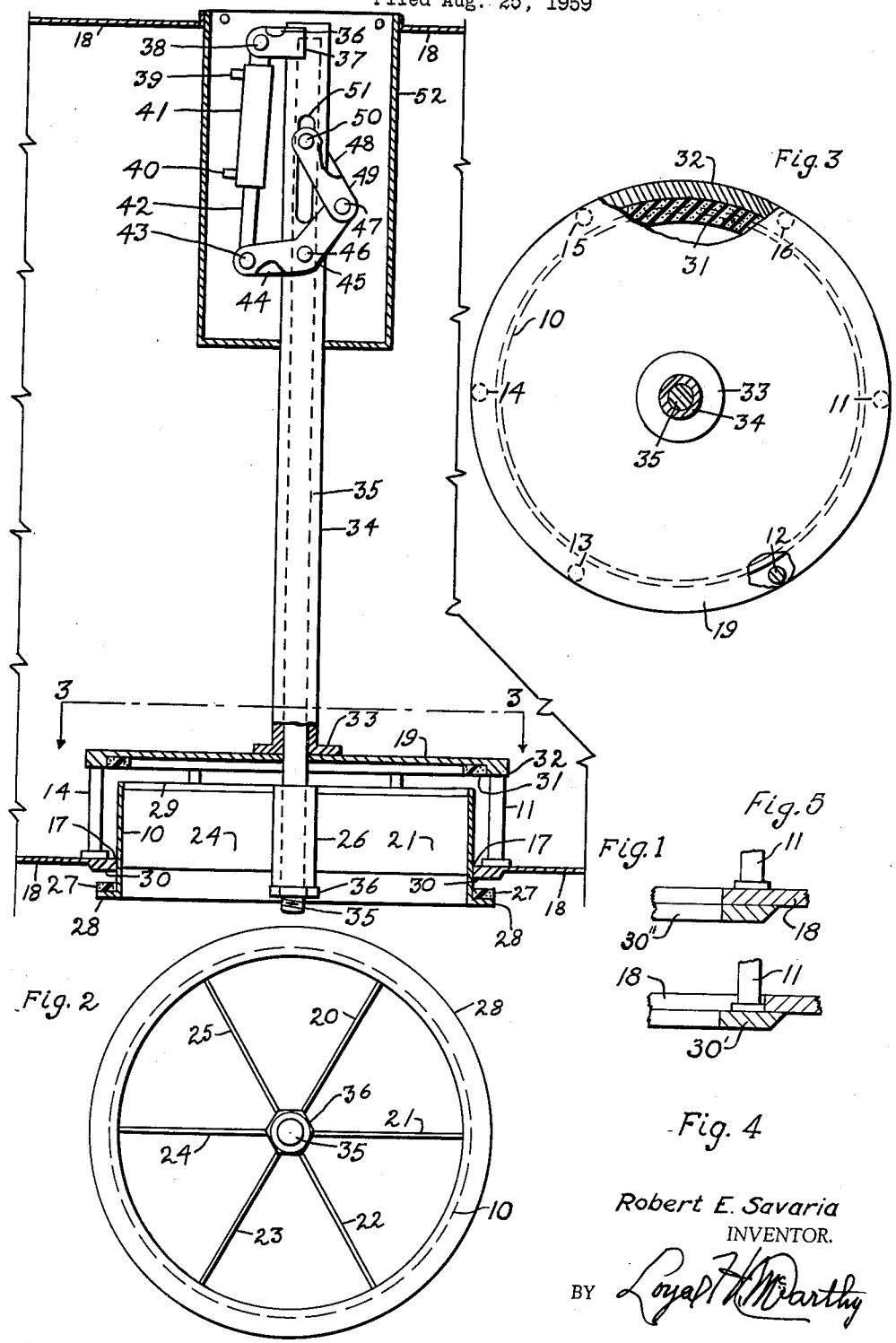
Robert E. Savaria
INVENTOR.
BY Loyal H. M'Carthy
ATTORNEY.

United States Patent Office 3,089,677
Patented May 14, 1963

3,089,677
DUMP VALVES FOR AIRCRAFT
Robert E. Savaria, Union, Oreg. (% Universal Air Tankers, Inc., P.O. Box 4600, Boise, Idaho)
Filed Aug. 25, 1959, Ser. No. 836,022
9 Claims. (Cl. 251—58)

My invention relates to improvements in dump valves such as those used in forest fire fighting equipment on large airplanes where it is necessary to discharge several hundred gallons of chemicals within a few seconds of time. Moreover, my invention is an improvement in the design of large valves in which a limited amount of power is available for opening or closing said valve with a minimum of delay.

It is among the disadvantages of dump valves in current use that, due to their great size, a large, unbalanced area is under pressure from the overlying fluid, so that hydraulic cylinders commonly used for actuating said valves must be of large volume to provide sufficient power. In view of the limited capacity of the hydraulic systems in some airplanes such large cylinders operate said valves too slowly for practical purposes. Another disadvantage of valves in present use is the submersion of the complex linkage and hydraulic system within the fire fighting chemicals, so that proper lubrication and adjustment is impossible. Furthermore, the placing of the linkage and cylinders proximal to the discharge area, as is a common practice in currently used valves of this type, produces great turbulence of the discharging chemicals, resulting in their being scattered too widely to suppress, effectively a forest fire.

Among the objects of my improvement in such valves is the provision of a valve having inherent hydrostatic balance, so that a minimum amount of power will be necessary to controllably discharge a large volume of chemicals within the required time limit. Another object of my invention is to provide an actuating mechanism which is entirely encased and protected from all chemicals contained within the associated tank. A further object of my invention is to provide a valve unit which is easily adjustable at all times. A still further object of my invention is to provide a hollow, cylindrical valve, having its interior divided into segments by fin-like radial spokes which tend to dispell turbulence in substances passing therethrough. Other and further objects and advantages will be apparent from the specification, drawings and claims herein.

Referring to the drawings:

FIG. 1 is a vertical elevational view of the entire mechanism with parts thereof broken away for purposes of clarity.

FIG. 2 is a plan view from the bottom surface of the valve proper.

FIG. 3 is a plan view in the direction of the arrows along line 3—3 of FIG. 1 with parts thereof broken away for purposes of clarity.

FIG. 4 is a fragmentary detail view of a structural variation of the lower sealing surface of the valve, showing the lower sealing surface as a separate element fixed to the tank and as a part of the valve cage assembly.

FIG. 5 is a fragmentary detail view of another structural variation of the lower sealing surface of the valve in which the lower sealing surface is a separate element secured to the bottom of a chemical tank.

Referring further to the drawings:

As seen in FIG. 1 and FIG. 2, this device includes a hollow cylindrical valve 10 vertically slidable within a cage-like assembly 32, formed by a disk-like member 19 and by a plurality of vertical struts 11, 12, 13, 14, 15 and 16, which are spaced equidistantly about the periphery of a circular opening 17 formed in the bottom of a tank 18. Struts 11, 12, 13, 14, 15 and 16 support disk-like member 19 in a fixed position parallel to and above the plane of the circular opening 17 in the bottom of tank 18, thus providing an annular passage for the admission of fluid into the limits of the valve cage. As shown in FIG. 1 and FIG. 2, the cylindrical valve sleeve 10 is open at both ends and is provided with fin-like spoke members 20, 21, 22, 23, 24 and 25 extending radially from a central hub 26 to said valve sleeve 10. The said fin-like spoke members 20, 21, 22, etc., are, preferably, flat, rectangular elements and, preferably, extend downwardly throughout a large portion of the length of the valve sleeve 10. The lower edge of the valve sleeve 10 is provided with an external circumferential flange 28, said flange supporting on its top surface a soft gasket 27 of any suitable material; the upper edge 29 of said valve sleeve 10 is suitably machined to form a water-tight seal which cooperates with a gasket 31 of any suitable material secured to the under side of said disk 19. The under surface of the disk 19 may be recessed, as shown in FIG. 1 of the drawings, so that gasket 31 will be seated within the recessed portion thereof, or it may be a flat or of any other suitable design. The lowermost surface 30 of the bottom of said tank 18, immediately and outwardly concentric of said valve sleeve 10 is suitably machined and positioned to contact and form a water-tight seal with the said gasket 27 whenever the valve mechanism is in the closed position. The said lowermost surface 30 of the valve cage may be an integral part of said tank 18, a part of the valve cage assembly 32 itself, or other suitable arrangement, so long as it enables a water-tight and sealing contact with gasket 27. For example, as seen in FIG. 4, the lowermost surface 30' of the valve cage may be a part of the valve cage assembly having the struts 11, 12, 13, 14, 15 and 16 thereof positioned directly on top of the said lowermost surface element 30'. In this variation 30' the struts 11, 12, 13, 14, 15 and 16 and the disc-like member 19 would form a complete valve cage unit which could be inserted into any tank to enable operation of the dump valve. In this arrangement the lowermost surface element 30' would extend sufficiently beyond the outer sides of the struts 11, 12, 13, 14, 15 and 16 so as to enable a secure and suitable attachment to the bottom of tank 18. Another variation of the lowermost surface of the valve cage is best seen in FIG. 5 in which the lowermost surface 30'' is a separate element from the bottom of a tank 18 but which is fixedly secured to the outer surface of the bottom of the tank. In this variation the struts 11, 12, 13, 14, 15 and 16 would be mounted on the inner surface of the bottom of the tank 18.

Associated with the actuating and supporting means of said valve sleeve 10 is a vertical tube 34, having a flanged lower end 33 secured to the top surface of the disk 19 in a central position. A rod 35 passes through and is slidably movable in tube 34 and, also, extends through the hub 26 of said valve sleeve 10. Said rod 35 has a nut 36 threaded onto its lower end to adjustably support and actuate said valve sleeve 10, the rod 35 in turn being supported and slidably controlled by a suitable hydraulic cylinder and link mechanism mounted on and supported by tube 34. As seen in FIG. 1, the linkage system is symmetrical with reference to a plane passing through the longitudinal axis of rod 35 parallel to the plane of the drawings, so that said parts of the linkage system, including member 37, 45 and 49 have counter parts 36, 44 and 48 on the distant side of the tube 34. The hydraulic cylinder per se and the more intimately associated members thereof do not have counterparts.

A hydraulic cylinder 41 is pivotally mounted on a journal pin 38 between ears 36 and 37 projecting horizontally from the top of tube 34. Said cylinder 41 is of the double-acting type, having a piston rod 42 adapted to impart push or pull forces to an articulating pin 43 which passes through said piston rod 42, lever 45 and its counterpart lever 44. Cylinder 41 is, also, provided with fittings 39 and 40 at its upper and lower ends respectively, to connect with and receive fluid, under proper control, from the hydraulic system of the aircraft. Such hydraulic systems are considered to belong to separate and prior arts and, hence, are not deemed a part of the present invention except insofar as my device is operated in combination with such systems as already may be existing in the aircraft in which the device is installed. A stud 47 rigidly attached to lever 45 is positioned to articulate with one end of link 49, while a pin 50 passes through the opposite end of link 49, a vertical slot 51 in the proximal face of said tube 34, a hole through said rod 35, then through the counterpart of slot 51, said counterpart being formed in the distal face of said tube 34, and finally through the link 48 which is the counterpart of the link 49.

A casing 52, having a water-tight seal at the point at which the tube 34 passes through its bottom, is provided to protect the hydraulic mechanism from the liquid chemicals in the tank 18. The casing 52 is designed and arranged with respect to tank 18 so as to permit adjustment of and access to the linkage, hydraulic cylinder, etc., and, also, to protect them from chemicals within the tank 18.

Assuming that the various parts of the mechanism are in the attitude indicated in FIG. 1 of the drawings, the operation of my device may be described as hereinafter set out. With the valve sleeve 10 lowered out of contact with gasket 31 liquid entering the valve cage 32 flows through the annular passage then existing between gasket 31 and edge 29 of the valve sleeve 10 and then discharges downwardly through the segmental passages between the radial fins 20, 21, 22, 23, 24 and 25 within said valve sleeve 10. As the liquid passes from the tank 18 through the segmental passages between the radial fins 20, 21, 22, etc., of the valve sleeve 10, its omnidirectional flow and the resultant eddies and turbulence therein are channeled into a unidirectional flow by said segmental passages. Hence, as the liquid escapes from the valve into the air it is free from undersirable characteristics which tend to break up and to reduce the effectiveness of the mass of liquid being discharged. To secure closure of the valve it is only necessary for the operator to apply fluid pressure from the aircraft's hydraulic system to the uppermost fitting 39 of cylinder 41, thus extending the piston rod 42 downwardly. In response to the extension of piston rod 42 levers 44 and 45 rotate counter-clockwise to force links 48 and 49 and, hence, the rod 35, through connecting pin 50, upwardly. By means, including the nut 36, the upward travel of rod 35 causes valve sleeve 10 to be lifted and thereby brings surface 29 of said valve sleeve 10 into a water-tight contact with the gasket 31 which is positioned on the lower surface of the disk 19. Simultaneously, a corresponding contact between the surface 30 and the gasket 27 at the lower end of said valve sleeve 10 results in a water-tight seal between the bottom of tank 18 and the external cylindrical surface of valve sleeve 10. All passages from the tank through or around the said valve sleeve 10 are then shut off. Admission of hydraulic fluid pressure to the lowermost fitting 40 of cylinder 41 reverses the entire process, thereby lowering the rod 35 and the valve sleeve 10 to open the valve, as desired by the operator.

While a specific type of actuating mechanism has been described herein by way of illustration, I am aware that there are many other embodiments, including mechanically equivalent devices, which could be used to open and close the cylindrical valve without materially departing from the spirit and scope of this invention; and, hence, I am not to be understood as limiting the scope of my invention or claims to the exact structure shown.

Having thus described my invention, I claim:

1. In dump valves for aircraft: a hollow cylindrical valve sleeve open at each end; a hub positioned within said valve sleeve and provided with a hole therethrough; a plurality of fixed, radial, fin-like spokes equidistantly spaced around said hub, each secured at equidistantly spaced points on said valve sleeve and each extending longitudinally of said valve sleeve; an integral flange circumscribing the lower edge of said valve sleeve; a sealing gasket positioned on the upper surface of said integral flange and around said valve sleeve; a valve support provided with a hole through the bottom thereof, said hole being complementary to the outer peripheral configuration of said valve sleeve, and having a sealing surface outwardly concentric of said hole on its lower surface, said sealing surface seating and sealing with said gasket and flange in the closed position of said valve sleeve; a plurality of vertical strut members projecting from said support equidistantly spaced from each other outwardly concentric of said hole and secured on said support; a disk-like member, secured to and supported by said vertical strut members, having a hole therethrough; a sealing gasket secured to the under surface of said disk-like member positioned concentrically inwardly from said vertical struts and directly over the upper edge of said valve sleeve, seating and sealing with the upper edge surface of said valve sleeve in its closed position; a vertical tube with an integral flange at its lower end secured on the upper surface of said disk-like member in axial alignment with the hole through said disk-like member and with a vertical slot therethrough near its upper end; a water-tight casing open at the top and closed at the bottom having a hole through said bottom engaging upon said tube medially thereof and forming a water-tight seal therewith at a point below said vertical slot through said tube; a complementary rod slidably mounted in said tube, extending through the said hole in said hub at its lower end and projecting above said slot through said tube near its upper end; a pair of levers pivotally attached medially thereof to opposite sides of said tube within said water-tight casing and below said vertical slot; a pin through said rod extending beyond each side of said tube through said vertical slot therein; a pair of link members each connecting one end of one of said levers to an end of said pin; a pair of flanges in spaced relation rigidly secured to said vertical tube at a point above said vertical slot therein; a push-pull hydraulic cylinder pivotally connected between the other ends of said lever members at one of its ends and pivotally attached between said pair of flanges at its other end; a pair of connections on said hydraulic cylinder for supplying pressure fluid to and exhausting said pressure from said cylinder, one of said connections being at one end of said hydraulic cylinder and the other connection being at the other end of said hydraulic cylinder; threads on the portion of the lower end of said slidable rod projecting below said hub; and a nut threadably engaged upon said threads on the lower end of said rod, retaining said hub and valve sleeve on said rod in the various positions thereof.

2. In dump valves for aircraft: a hollow cylindrical valve sleeve open at each end; a hub positioned concentrically within said valve sleeve and provided with a concentric hole therethrough; a plurality of fixed, radial fin-like spokes equidistantly spaced around said hub, each secured at its outer end to equidistantly spaced points on said valve sleeve and each extending longitudinally of said valve sleeve to points inwardly from the open ends thereof; an integral flange circumscribing the lower edge of said valve sleeve; a sealing gasket positioned on the upper surface of said integral flange and around said valve sleeve; a valve support being provided with a hole through the bottom thereof, said hole being complementary to the outer peripheral configuration of said valve sleeve, and having a sealing surface outwardly concentric of said hole on its lower surface, said sealing surface seating and sealing with said gasket and flange in the closed position of said valve sleeve; a plurality of vertical strut members equidistantly spaced from each other outwardly concentric of said hole and secured on said valve support; a disk-like member, secured to and supported by said vertical strut members, having a concentric hole therethrough; a sealing gasket, secured to the under surface of said disk-like member, positioned concentrically inwardly from said vertical struts and outwardly from said concentric hole, said sealing gasket being directly over the upper edge of said valve sleeve, seating and sealing with the upper edge surface of said valve sleeve in its closed position; a vertical tube with an integral flange at its lower end secured on the upper surface of said disk-like member in axial alignment with the concentric hole through said disk-like member and with a vertical slot therethrough near its upper end; a water-tight casing open at the top and closed at the bottom having a hole through said bottom engaged upon said tube medially thereof and forming a water-tight seal therewith at a point below said vertical slot through said tube; a complementary rod slidably mounted in said tube, extended through the said hole in said hub at its lower end and projecting above said slot through said tube near its upper end; a pair of levers pivotally attached medially thereof to opposite sides of said tube within said water-tight case and below said vertical slot; a pin through said rod extending beyond each side of said tube through said vertical slot therein; a pair of link members, each connecting one end of one of said levers to an end of said pin; a pair of flanges in spaced relation rigidly secured to said vertical tube at a point above said vertical slot therein; a push-pull hydraulic cylinder pivotally connected between the other ends of said lever members at one of its ends and pivotally attached between said pair of flanges at its other end; a pair of connections on said hydraulic cylinder for supplying pressure fluid to and exhausting said pressure from said cylinder, one of said connections being at one end of said hydraulic cylinder and the other connection being at the other end of said hydraulic cylinder; threads on the portion of the lower end of said slidable rod projecting below said hub; and a nut threadedly engaged upon said threads on the lower end of said rods, retaining said hub and valve sleeve on said rod in the various positions thereof.

3. In dump valves for aircraft: a hollow, cylindrical valve sleeve open at each end; a hub positioned within said valve sleeve and provided with a hole therethrough; a plurality of fixed, radial, fin-like spokes spaced around said hub, each secured at its outer end to spaced points on said valve sleeve, thereby forming radial segmental passages within said valve sleeve; an integral flange circumscribing the lower edge of said valve sleeve; a gasket positioned on the upper surface of said integral flange and around said valve sleeve; a valve support provided with a hole therethrough, said hole being complementary to the outer peripheral configuration of said valve sleeve; a sealing surface attached to the lower surface of said valve support around said hole therein, said sealing surface seating and sealing with said gasket and flange in the closed position of said valve sleeve; a plurality of vertical strut members spaced from each other and secured on the upper surface of said sealing surface; a disk-like member, having a hole therethrough, secured to and supported by said vertical strut members; a gasket secured to the under surface of said disk-like member and positioned directly over the upper edge of said valve sleeve, said gasket seating and sealing with the upper edge surface of said valve sleeve in its closed position; a vertical tube with an integral flange circumscribing its lower end, secured on the upper surface of said disk-like member in axial alignment with the hole through said disk-like member and with a vertical slot diametrically disposed therethrough near its upper end; a water-tight casing open at the top and closed at the bottom, said bottom having a hole therethrough engaging upon said tube medially thereof and forming a water-tight seal therewith at a point below said diametrically disposed vertical slot through said tube; a complementary rod slidably mounted in said tube, said rod extending through said hole in said hub at its lower end and projecting above said diametrically disposed slot through said tube near its upper end; push-pull actuating means at the upper end of said tube; connecting means between said slidable rod and said push-pull means, actuating said rod in said tube; and means fixedly securing said valve sleeve hub to the lower end of said rod.

4. In dump valves for aircraft: a cylindrical valve sleeve open at each end; a hub positioned concentrically within said valve sleeve and provided with a concentric hole therethrough; a plurality of fixed, radial fin-like spokes spaced around said hub, each secured at its outer end at spaced points on said valve sleeve and each extending longitudinally within said valve sleeve, thereby forming segmental passages; an integral flange circumscribing the lower edge of said valve sleeve; a sealing gasket positioned on the upper surface of said integral flange and around said valve sleeve; a valve support provided with a hole therethrough, said hole being complementary to the outer peripheral configuration of said valve sleeve; a sealing surface attached to the lower surface of said valve support outwardly concentric of said hole therein, said sealing surface seating and sealing with said gasket and flange in the closed position of said valve sleeve; a plurality of vertical strut members spaced from each other and secured on the upper surface of said valve support above said sealing surface; a disk-like member, having a concentric hole therethrough, secured to and supported by said vertical strut members; a gasket secured to the under surface of said disk-like member, positioned concentrically inwardly from said vertical struts and directly over the upper edge of said valve sleeve, said gasket seating and sealing with the upper edge surface of said valve sleeve in its closed position; a vertical tube with an integral flange circumscribing its lower end, secured on the upper surface of said disk-like member in axial alignment with the concentric hole through said disk-like member and with a vertical slot diametrically disposed therethrough near its upper end; a liquid-tight casing open at the top and closed at the bottom, said bottom having a hole therethrough engaging upon said tube medially thereof and forming a liquid-tight seal therewith at a point below said diametrically disposed vertical slot through said tube; a complementary rod slidably mounted in said tube, the lower end of said rod extending through said hole in said hub and the upper end of said rod projecting above said diametrically disposed slot through said tube; push-pull actuating means at the upper end of said tube; connecting means between said slidable rod and said push-pull means, actuating said rod in said tube; and means fixedly securing said said valve sleeve hub to the lower end of said rod.

5. In dump valves for aircraft: a cylindrical valve sleeve open at each end; a hub positioned within said valve sleeve and provided with a hole therethrough; a plurality of fixed, radial, fin-like spokes spaced around said hub, each secured at its outer end to spaced points on said valve sleeve and each extending longitudinally within said valve sleeve, thereby forming segmental passages therewithin; an integral flange circumscribing the lower edge of said valve sleeve; a gasket positioned on the upper surface of said integral flange and around said valve sleeve; a valve support provided with a hole therethrough; a cage-like valve housing consisting of an upper disk-like member provided with a hole therethrough, spaced support members secured to said disk-like member, and a sealing lower surface element, provided with a hole therethrough complementary to said valve sleeve and secured to the lower ends of said spaced support members, said cage-like member being positioned around said valve sleeve; a gasket secured to the under surface of said disk-like member and directly over the upper edge of said valve sleeve, said gasket seating and sealing with the upper edge surface of said valve sleeve in its closed position; a vertical tube, secured at its lower end on the upper surface of said disk-like member in axial alignment with the hole through said disk-like member, and with a vertical slot diametrically disposed therethrough near its upper end; a water-tight casing open at the top and closed at the bottom, said bottom having a hole therethrough engaging upon said tube medially thereof and forming a water-tight seal therewith at a point below said diametrically disposed vertical slot through said tube; a complementary rod slidably mounted in said tube, said rod extending through said hole in said hub, secured to said valve sleeve hub at its lower end and projecting above said diametrically disposed slot through said tube near its upper end; push-pull actuating means at the upper end of said tube; and connecting means between said slidable rod and said push-pull means, actuating said rod in said tube.

6. In dump valves for aircraft: a cylindrical valve sleeve open at each end; a hub positioned concentrically within said valve sleeve and provided with a concentric hole therethrough; a plurality of fixed, radial, fin-like spokes spaced around said hub, each secured at its outer end to spaced points on said valve sleeve; an integral flange circumscribing the lower edge of said valve sleeve; a gasket positioned on the upper surface of said integral flange and around said valve sleeve; a valve support provided with a hole therethrough; a cage-like valve housing, consisting of an upper disk-like member provided with a concentric hole therethrough, spaced support members secured to the under surface of said disk-like member, and a sealing lower surface element provided with a concentric hole therethrough complementary to said valve sleeve and secured to the lower ends of said spaced support members, said cage-like member being positioned around said valve sleeve; a gasket secured to the under surface of said disk-like member and positioned concentrically outwardly from said hole therein and directly over the upper edge of said valve sleeve, said gasket seating and sealing with the upper edge surface of said valve sleeve in its closed position; a vertical tube, secured at its lower end upper surface of said disk-like member in axial alignment with the concentric hole through said disk-like member, and with a vertical slot diametrically disposed therethrough near its upper end; a liquid-tight casing open at the top and closed at the bottom, said bottom thereof having a hole therethrough engaging upon said tube medially thereof and forming a liquid-tight seal therewith at a point below said diametrically disposed vertical slot through said tube; a complementary rod slidably mounted in said tube, said rod extending through said hole in said hub at its lower end and projecting above said diametrically disposed slot through said tube at its upper end; push-pull actuating means near the upper end of said tube; connecting means between said slidable rod and said push-pull means, actuating said rod in said tube; and means fixedly securing said valve sleeve hub to the lower end of said rod.

7. In a dump valve for location in the lower part of a chemical-containing tank, a valve support having an opening therethrough provided with a sealing means around said opening thereof: a hollow cylindrical valve, open at both ends; fin-like spoke members attached to and within the cylindrical valve; a hub element to which the inner ends of the fin-like spokes are attached; a rod attached to the hub, said rod extending upwardly; raising and lowering means connecting with the upper end of said rod; a housing surrounding said raising and lowering means, said housing being open at the top and closed at the bottom; a disk-like element slidably circumscribing said rod above said hollow cylindrical valve and providing a sealing contact with the upper edge of said valve; a complementary tube, slidably encasing said rod, disposed between said housing and said disk-like element, said tube forming a water-tight seal with each of said elements; a flange extended outwardly from the bottom of said hollow cylindrical valve, said flange sealably contacting a sealing means on the outer surface of said valve support when the upper edge of said hollow cylindrical valve is in sealing contact with said disk-like element.

8. In dump valves: a cylindrical valve sleeve open at each end; a hub positioned within said valve sleeve; a plurality of fixed, radial fin-like spokes attached to and spaced around said hub, each secured at its outer end to spaced points on said valve sleeve and each extending longitudinally within said valve sleeve; an integral flange circumscribing the lower edge of said valve sleeve, said flange extending radially outward from said lower edge; a gasket positioned around said valve sleeve cooperating with the upper surface of said integral flange; a sealing surface around said valve sleeve and above said gasket and said integral flange, said sealing surface seating and sealing with said gasket and flange in the closed position of said valve sleeve; a plurality of strut members spaced apart from each other and secured on the upper surface of said sealing surface; a disk-like member having a hole therethrough secured to and supported by said strut members; a gasket secured to the under surface of said disk-like member and positioned over the upper edge of said valve sleeve, said second mentioned gasket seating and sealing with the upper edge surface of said valve sleeve in its closed position; a tube secured on the upper surface of said disk-like member in axial alignment with the hole through said disk-like member, said tube having a longitudinal slot diametrically disposed therethrough near its upper end; a complementary rod slidably mounted in said tube, said rod secured to said hub at its lower end and projecting above said diametrically disposed slot through said tube near its upper end; double-acting hydraulic actuating means secured at the upper end of said tube; and links pivotally mounted on said tube, connecting said slidable rod and said hydraulic actuating means.

9. In dump valves: a tube secured to the outer surface of a housing for a dump valve in axial alignment with a hole through said housing, said tube having a longitudinal slot diametrically disposed therethrough near its opposite end; a complementary rod slidably mounted in said tube, said rod projecting above said diametrically disposed slot through said tube and secured at its other end to the hub of a hollow cylindrical sleeve valve in said housing, said sleeve valve having radially segmented compartments; double acting hydraulic actuating means secured near the slotted end of said tube; and the links pivotally mounted on said tube connecting said slidable rod and said hydraulic actuating means.

References Cited in the file of this patent

UNITED STATES PATENTS

| 556,507 | La France | Mar. 17, 1896 |
| 1,004,494 | Stumpf | Sept. 26, 1911 |
| 1,143,999 | Rosencrans | June 22, 1915 |
| 1,447,021 | Hamer | Feb. 27, 1923 |
| 1,473,474 | Drake | Nov. 6, 1923 |
| 2,019,502 | Osgood | Nov. 5, 1935 |
| 2,537,119 | Bauerlein et al. | Jan. 9, 1951 |
| 2,942,620 | Medearis | June 28, 1960 |

FOREIGN PATENTS

| 514,187 | France | Nov. 13, 1920 |